April 25, 1967  H. J. HAZELTON  3,315,786
CONVEYOR APPARATUS
Filed Oct. 22, 1965  8 Sheets-Sheet 6

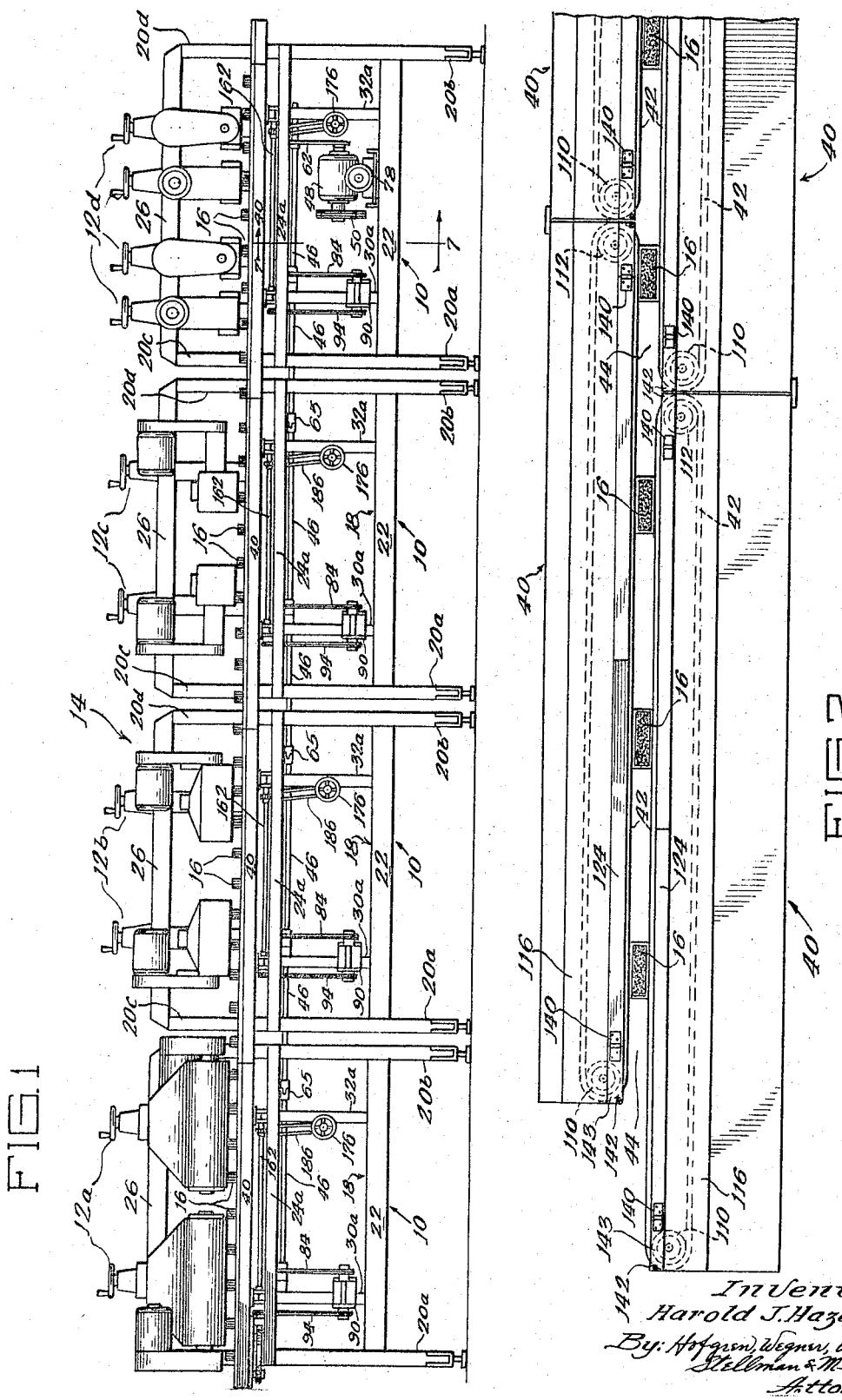

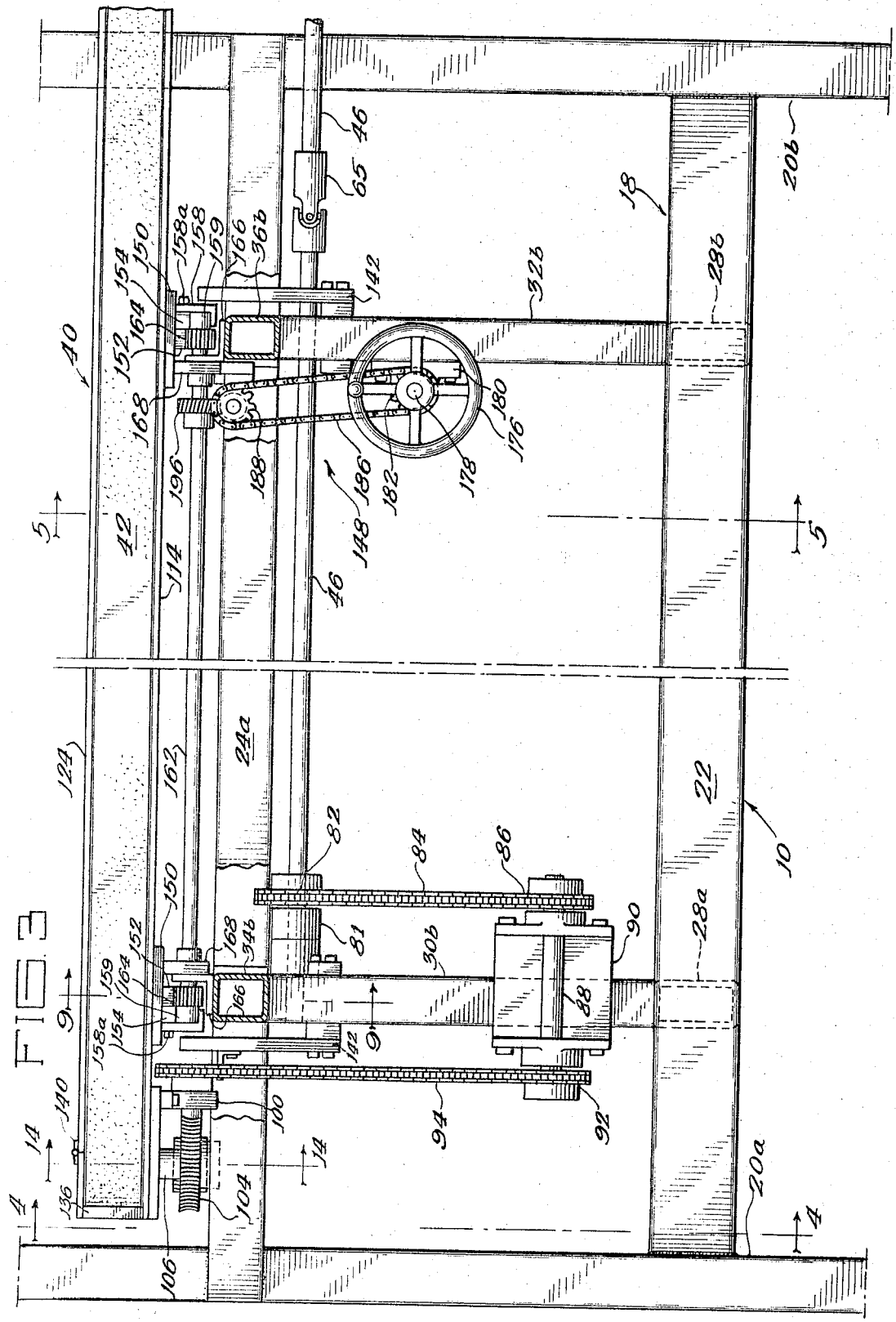

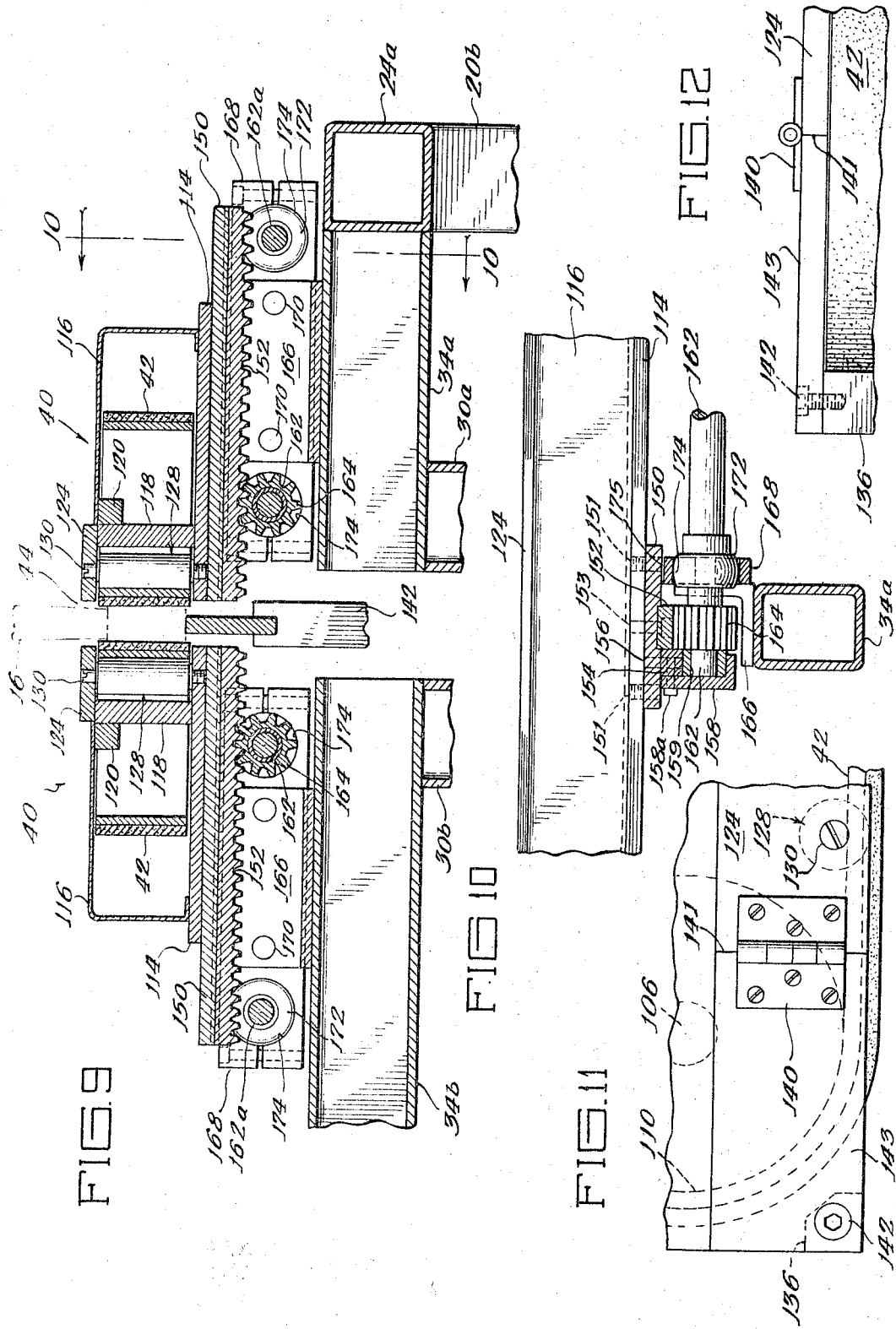

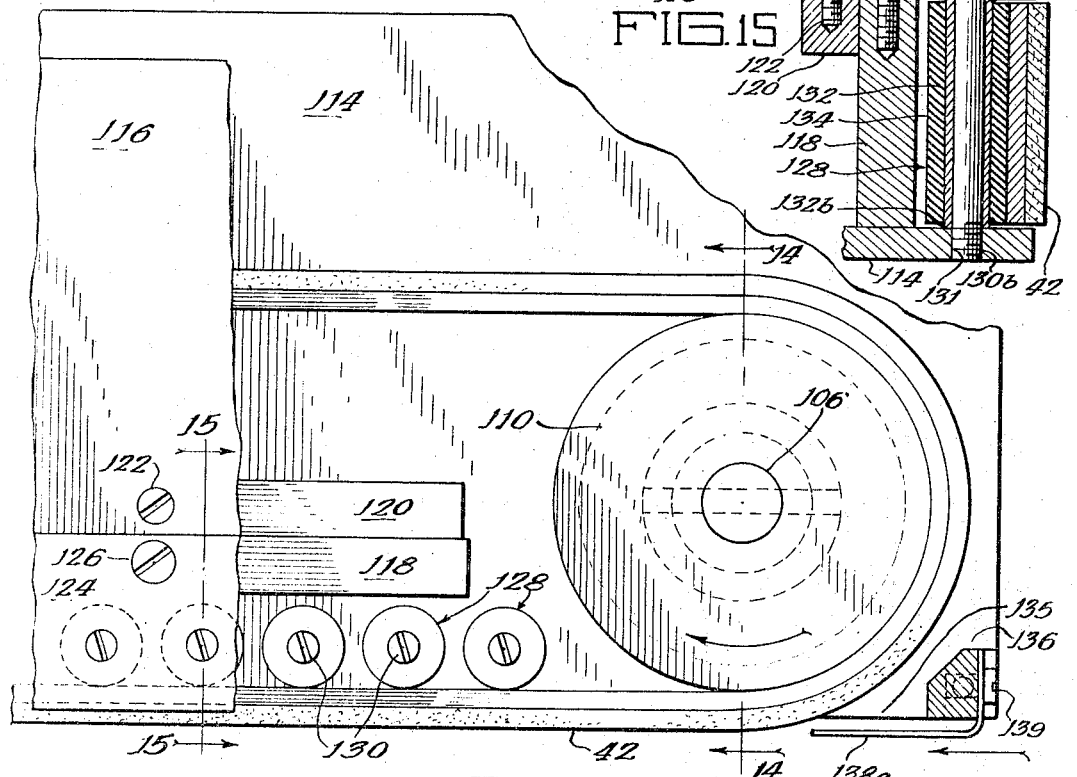

1

3,315,786
CONVEYOR APPARATUS
Harold James Hazelton, Batavia, Ill., assignor to Carlson Tool & Machine Company, a corporation of Illinois
Filed Oct. 22, 1965, Ser. No. 500,741
11 Claims. (Cl. 198—102)

This application relates to work handling apparatuses and more particularly to a new and improved conveyor apparatus.

Conveyor systems are frequently used to transport articles of manufacture through a processing station wherein several work operations are performed on the article. The conveyor may or may not be directly related to the several devices which perform the work operations on the article. Once the article leaves the general working station wherein the several functions are performed, it typically must be transported by some other means to further working stations where more operations are to be performed upon the article.

This invention is directed to the provision of a basic conveyor unit having a frame upon which an article transporting conveyor system is mounted and having provision for the mounting of work fabricating or finishing devices on the frame in a position to perform work on the article being fed through the conveyor so that each unit may be an independent entity with the working stations directly associated with the unit. Moreover, the conveyor unit of this invention is constructed and arranged in such a manner that the units may be directly associated in tandem fashion and the article continuously conveyed through a plurality of such tandem associated conveyor units without any interruption in the procession of the article nor any external assistance in the flow of the article through the conveyor apparatus. In this manner, basic conveyor units may be provided with different fabricating or finishing accessories for performing different operations on the article so that, depending on the type of accessory selected and the manner in which the units are arranged, each individual user my be provided with an individual or plurality of work fabricating units which may perform the desired work steps on an article of manufacture in the desired sequence as one continuous, uninterrupted operation.

For example, in the manufacture of brushes, several operations may be performed upon the brush bristle after the bristles have been bundled together and bound in the brush. To provide the desired brush configuration for paint brushes, for example, the bristles should be properly tapered and, in the case of artificial brush fibers, provided with split ends. This may require that the brush bristles be subjected to four or five different finishing operations by a total of ten or twelve brush finishing accessories. This can be performed while the bristles are bound in the brush prior to assembly of the handle or after, as desired. During the finishing of the brush bristles, it is desirable that the brush be grasped along the two faces of the brush which afford the greater surface area for gripping the brush as well as permitting the free ends of the bristles to be presented to the finishing machines. Merely situating a brush heel without a handle on top of a supporting moving conveyor belt is inadequate since there is nothing to restrain the free movement of the brush when subjected to the various finishing devices. Thus it became desirable to provide a conveying apparatus which would firmly grip an article being conveyed along the large planar facial surfaces thereof without regard to the length of a handle or other projection attached to the body of the article and wherein such an article might be successively conveyed through a plurality of such units mounted in a tandem-like fashion continuously and without external assistance.

It is therefore a general object of this invention to provide a new and improved conveyor unit.

It is a primary object of this invention to provide a novel individual nestable conveyor unit which may be assembled in tandem-like fashion with other identical units to continuously transport an article from one conveyor unit to another without external assistance or interruption.

It is another object to provide a new and improved conveyor unit wherein a work piece is carried through a bottomless channel between spaced parallel belts by engagement of the belts with the opposite faces of the work piece.

Still another object of this invention is to provide a new and improved fabricating unit having a conveyor for transporting an article to be worked on through the unit wherein the units may be positioned in tandem-like fashion with relation to one another for performing different fabricating functions and continuously transporting the article being worked upon through the several assembled units.

It is a further object of this invention to provide a new and improved continuous conveyor system made up of a plurality of identical conveyor units supporting different fabricating elements wherein a work piece may be continuously transported between the several units without external assistance or interruption by carrying the work piece in a bottomless channel which may be adjusted in width to accommodate work pieces of different sizes and configurations.

Other objects, features and advantages of the present invention will be apparent from the following description of the preferred embodiments illustrated in the accompanying drawings, in which:

FIGURE 1 is a side elevational view of a plurality of individual conveyor units of this invention assembled in a tandem-like fashion for conveying brush bristles through the assembly and showing different finishing accessories on each of the individual conveyor units for performing different finishing operations on the brush bristles;

FIGURE 2 is a fragmentary top plan view of the conveyor units of this invention showing the relation of two such units when positioned in a tandem-like fashion for continuously conveying articles therebetween;

FIGURE 3 is a fragmentary broken front elevational view of a conveyor unit of this invention;

FIGURE 9 is a fragmentary sectional view taken along the line 9—9 of FIGURE 3;

FIGURE 10 is a fragmentary sectional view taken along the line 10—10 of FIGURE 9;

FIGURE 11 is an enlarged fragmentary view of the end portion of the conveyor housing shown in top plan;

FIGURE 12 is a fragmentary enlarged view of the end portion of the conveyor housing shown in side elevation;

FIGURE 13 is an enlarged broken fragmentary view of the conveyor housing in top plan;

FIGURE 14 is a sectional view through the driven pulley at the end of the conveyor housing taken generally along the line 14—14 of FIGURE 13;

FIGURE 15 is a fragmentary sectional view taken along the line 15—15 of FIGURE 13; and FIGURE 16 is a fragmentary sectional view of an end portion of the conveyor housing showing a modified arrangement of the transfer clip.

Figure 4:
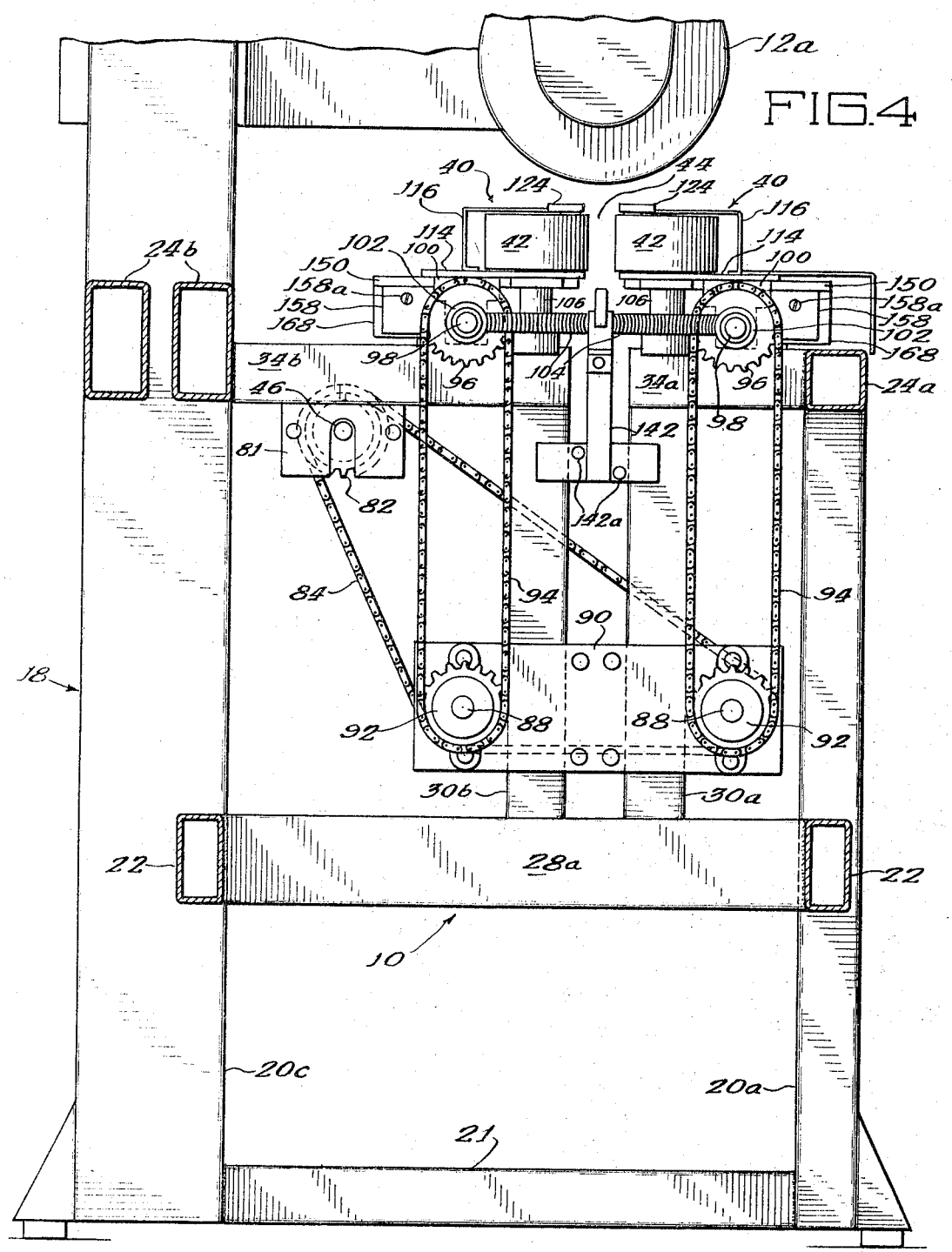
FIGURE 4 is a fragmentary sectional view taken along the line 4—4 of FIGURE 3.

Referring now to the drawings, FIGURE 1 shows a plurality of conveyor units 10 of this invention having brush finishing accessories such as 12a, 12b, 12c and 12d mounted on each of the substantially indentical basic units 10. Units 10 are assembled in a tandem-like fashion (illustrated in FIGURE 1 as a side-by-side relation) into a brushmaking assembly 14 wherein the bristles of brushes 16 are continuously fed through the assembly 14 and subjected to the different finishing operations by the several finishing accessories attached to each of the units.

Each conveyor unit is, save for the individual accessories, substantially identical and includes a box-like frame 18 having upright supporting legs such as the front legs 20a and 20b and the rear legs 20c and 20d which are of greater vertical extent than the front legs to support appropriate frame work to which the accessories may be attached. Each end of each unit may be provided with cross braces 21 near the bottom which extend between the front and rear legs and lower longitudinally extending braces 22, one of which extends between both front legs and one of which extends between both rear legs. Further included in the framework is a front intermediate longitudinally extending brace 24a which extends between the top of the two front legs 20a and 20b and two rear intermediate longitudinally extending braces 24b which extend between the two rear legs substantially in the same plane as the front brace 24a. Preferably the rear members 24b are larger and the two are spaced apart as shown in the drawings to facilitate mounting of the different accessories which may be utilized with the basic conveyor unit. Finally, an upper longitudinally extending brace 26 extends between the top of two rear legs 20c and 20d in an elevated relation relative to the braces 24a and 24b for also supporting accessories which may be attached to the unit.

Additional bracing and supporting members are provided between the front and rear legs such as the lower cross braces 28a and 28b, respectively, which extend between cross braces 22 inwardly of the front leg 20a and rear long 20c and front leg 20b and rear leg 20d, respectively. Each cross brace 28a and 28b has generally upright spaced apart parallel support members such as the front and rear suport members 30a and 30b on cross brace 28a and the front and rear support members 32a and 32b on cross brace 28b. Supporting legs are secured at the upper or free end of each of these support members, such as the front and rear supporting legs 34a and 34b for support members 30a and 30b, respectively, and the front and rear supporting legs 36a and 36b for the supporting members 32a and 32b, respectively. Each of these supporting legs extends from its respective supporting member toward the adjacent intermediaet longitudinal cross brace and away from the space between the supporting members to provide two spaced supporting surfaces which are generally parallel to the respective lower cross braces 28a and 28b.

The forwardly extending supporting legs 34a and 36a which extend from the supporting members 30a and 32a, respectively, to the intermediate front longitudinal brace 24a support a conveyor belt unit 40 and associated drive and adjusting mechanism therefore. The rearwardly extending supporting legs 34b and 36b which extend from supporting members 30b and 32b, respectively, to the rear intermediate longitudinal brace 24b also support an identical conveyor belt housing 40 situated as a mirror image relative to the housing supported on legs 34a and 36a and longitudinally offset and laterally spaced therefrom to define an article advancing channel between the housings.

As shown in FIGURE 2, the two housings 40 on each unit 10 are preferably longitudinally offset relative to each other so that a leading portion of one housing extends beyond the leading portion of the other housing and a trailing portion of the other housing extends beyond the trailing portion of the one housing. This offset affords a nestable relationship between a plurality of units 10 so that when they are assembled in a tandem-like fashion as illustrated in FIGURES 1 and 2, continuity of article feeding may be maintained between the several units. Each of the housings 40 is provided with a continuous conveyor belt 42 which extends longitudinally of the housing and generally coextensive in length therewith, with the belts being positioned so that they oppose each other to define a brush carrying channel 44 between the belts. Preferably the belts 42 are composed of a plurality of plies of material, such as a relatively soft sponge-like outer ply 42a and a relatively hard canvas-like backing ply 42b.

Each unit is provided with a master or main drive shaft 46 which, when connected to a source of power, by means of suitable linkage and other association to be described subsequently, drives the belts 42 for advancing articles through the channel. For providing a source of power to drive the drive shaft 46, each assembly 14 need be provided with only one motor 48. This motor may be mounted on any one of the units 10 and if the units are separaed from the assembly and used individually, motor 48 may be added to each of the individual units.

Figure 7:
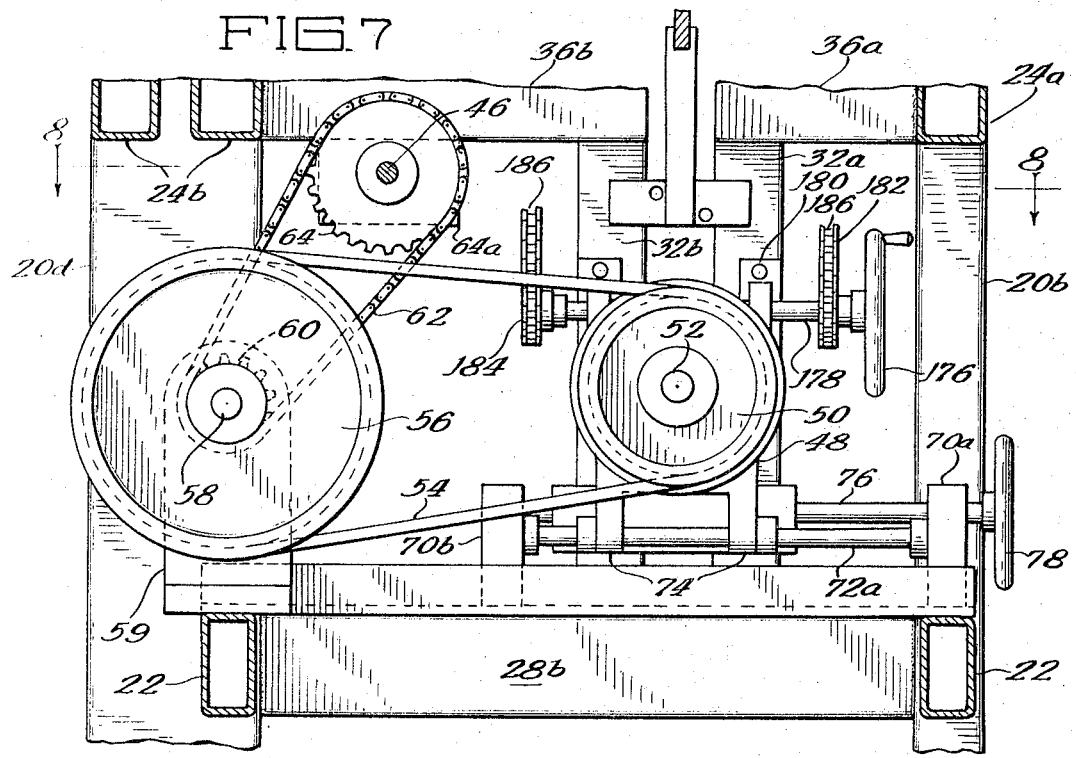
FIGURE 7 is a fragmentary sectional view taken along the line 7—7 of FIGURE 1 showing the mounting of the motor to the conveyor unit.
Figure 8:
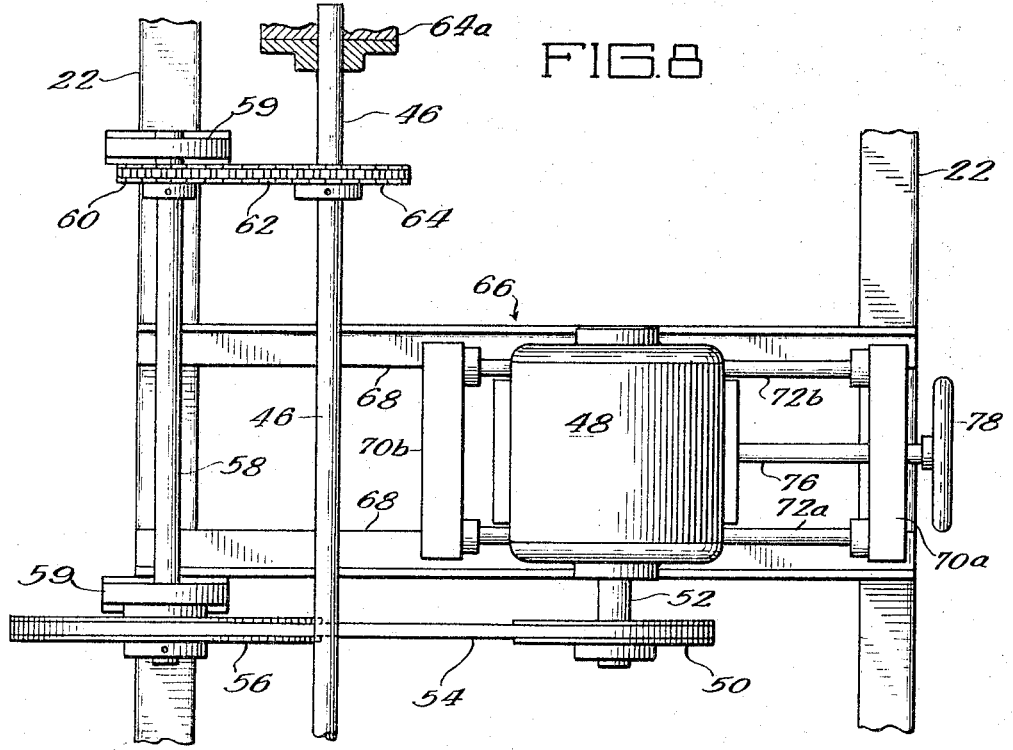
FIGURE 8 is a fragmentary sectional view taken along the line 8—8 of FIGURE 7 showing the motor mounting and drive connection to the main drive shaft.

Referring particularly to FIGURES 7 and 8, the motor 48 drives a pulley 50 which is mounted on motor shaft 52 for driving an endless belt 54 which extends around pulley 50 and also about pulley 56 mounted on a shaft 58. Shaft 58 is journalled for rotation in spaced members 59 supported on frame brace member 22. Shaft 58 is provided with a sprocket 60 for driving an endless chain 62 which extends around a sprocket 64 attached to main drive shaft 46 for rotating the shaft. The shaft 46 is journalled in a member 64a which is attached to a frame supporting leg 36b.

The opposite ends of each shaft 46 are provided with mating male and female universal joint members, generally designated 65, for connecting the several shafts together when the units are mounted as an assembly 14 so that only one drive source or motor 48 is necessary for driving all of the conveyor belts of the assembly.

The motor itself is mounted on a motor support means 66 including a spaced pair of cross braces 68 which extend between the lower longitudinal braces 22. Cross braces 68 support front and rear uprights 70a and 70b, respectively, which in turn support spaced parallel slide bars 72a and 72b which extend across the width of the unit 10 in a plane generally parallel to the cross braces 68. The motor is provided with a mounting including legs 74 which embrace the bars 72a and 72b so that the motor is slidably mounted with respect to these bars. A shaft 76 is also mounted in upright 70a and extends into the motor mounting and is provided with a threaded end (not shown) so that by turning the handle 78 which is mounted on the free end of shaft 76, the motor may be moved longitudinally with respect to the bars 72a and 72b. This in turn will either increase or decrease the tension in belt 54 and in this manner, through a variable speed pulley 50, the speed of drive shaft 46 and the conveyor belt may be adjusted from the output of motor 48 even if the motor is a constant speed motor.

Figure 6:
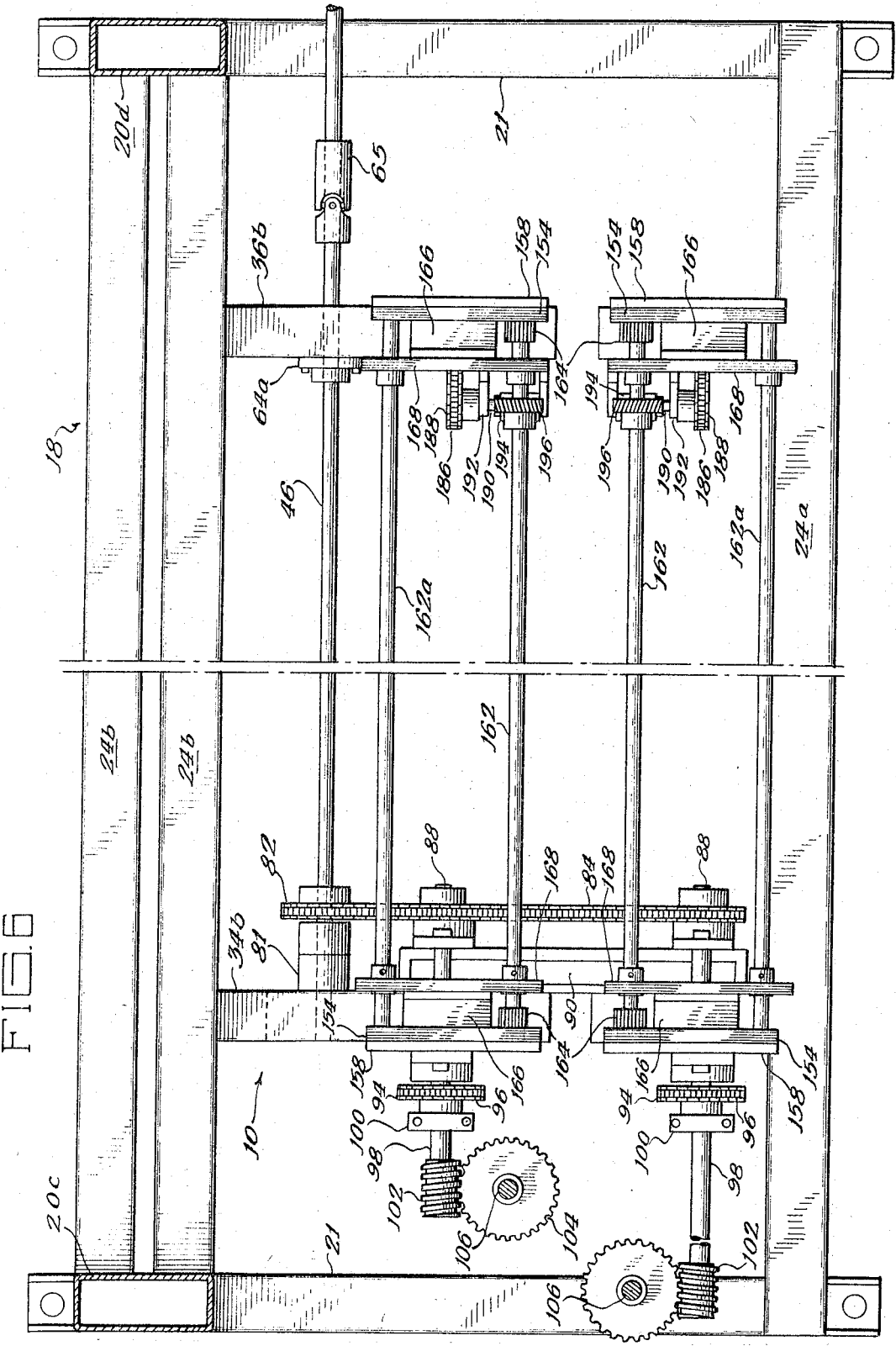
FIGURE 6 is a fragmentary broken view in top plan of a conveyor unit with the conveyor housing removed.

With particular reference to FIGURES 3 and 4, the drive shaft 46 drives both belts 42 of each unit 10 by means permitting the adjustment of the distance between the belts. A bearing or journalling means 81 for shaft 46 may be attached to supporting leg 34. The shaft 46 is provided with a sprocket 82 positioned on the shaft at a point close to supporting leg 34b but between the legs 34b and 36b. An endless chain 84 extends around sprocket 82 and also around sprocket 86 mounted on shafts 88 on either side of support members 30a and 30b in a housing 90 secured to support members 30a and 30b slightly above the cross brace member 28a. The other end of each of the shafts 88 (to the left of support members 30a and 30b as viewed in FIGURE 3) is provided with a sprocket 92. Each sprocket 92 drives an endless chain 94 through a generally vertical path, the other end of each chain being secured to a sprocket 96 mounted on a wormshaft 98 journalled for rotation in a bearing support 100 fastened to the underside of each belt housing 40. In turn, each wormshaft 98 is provided with a worm gear 102 which is in engagement with a gear 104. Gears 104 are fixed on the underside of the leading end of each housing 40 on a belt driving pulley shaft 106 journalled for rotation in each housing 40 in a bushing 108. As best seen in FIGURE 6, to accommodate the longitudinal offset of the belt housings relative to each other and to the frame, one wormshaft 98 may have a greater length than the other wormshaft to position its respective worm gear 102 in engagement with its associated gear 104.

As illustrated in FIGURES 13 through 16, in the interior of the leading end of each housing 40, belt driven pulley 110 is fixed to the shaft 106. Idler pulley 112 is rotatably mounted at the opposite or trailing end of each housing, and belt 42 is wrapped about pulleys 110 and 112. As the shaft 46 is rotated, it rotates the wormshaft 98 and worm gear 102 which engages gear 104 on the lower end of shaft 106. Belt driving pulley 110, fixed on the upper end of shaft 106 in the interior of the housing, will drive each belt 42 through an article advancing path.

Each housing 40 is a box-like structure having a base plate 114 and a belt guard or cover 116. A spacer bar or wall 118 is positioned on base plate 114 near the brush carrying channel 44. At its upper end, spacer bar 118 supports a rod 120 on its interior side. The cover 116 is secured to rod 120 by suitable fastening means such as a screw 122.

A top plate 124 is mounted on top of spacer bar 118 by suitable fastening means such as a screw 126 and extends inwardly toward the channel 44. A plurality of back-up rollers 128 are mounted along the edge of the housing between top plate 124 and base plate 114 just behind the belt 42 to provide a generally rigid backing surface for the belt.

Each roller 128 includes a pin 130 having a notched screw head end 130a and a threaded end 130b received in a threaded aperture 131 in the base plate 114. Each roller further includes a brass tube bearing 132 concentrically positioned about the pin 130 and having upper and lower ends 132a and 132b which facially engage the inner surfaces of top plate 134 and base plate 114, respectively. A relatively hard rubber covering is concentrically positioned about the bearing 132 with its upper and lower ends terminating short of the portions 132a and 132b so that these portions of the bearing act as a spacer permitting relatively free rotation of the rubber roller about the pin 130.

Even though the pulleys are mounted at substantially the extreme end of the housing with slightly more than the sufficient amount of clearance for the belt to wrap about the pulley, due to the curvature of the pulleys there is a space in the path of brush travel generally indicated at 135 between the end of the belt housing and the point where the belt 42 assumes a linear path of travel. Even though the article being conveyed is always going to have at least one side in engagement with a conveyor, the other side will, at the point of transition from one unit 10 to the other unit 10, have to pass by such a space 135.

To facilitate the smooth transition of articles from one tandem associated conveyor housing 40 to the next conveyor housing, an auxiliary support means or surface is provided. Included in this means is a transfer spring clip post 136 located at the extreme end of the housing adjacent the channel 44. At the incoming end of the housing, this post supports a transfer spring clip 138a which provides a bearing surface for the article being conveyed in the channel until such time as the article is fed to a point wherein it can engage belt 42. This clip is generally an L-shaped bent member of sheet metal or the like, affording a planar contact surface to the conveyed article. At the other or outgoing end of the housing, the post supports an outgoing transfer spring clip 138b which is an L-shaped member of sheet metal bent back upon itself so that the free end is facing the direction of article travel rather than opposing it as would be the case if the member 138a were used. Each spring clip may be supported to its respective post by a suitable fastening means such as the screw 139.

Referring to FIGURES 11 and 12, near each end of each housing, the top plate 124 is provided with a hinge 140 and separated along a line 141. A small screw 142 is located at the extreme corner of the free hinged portion 143 of top plate 124 so that by removing screw 142 the portion 143 may be swung upwardly about its hinge connection 140 to expose the interior of the free end portions of the housing, to afford an easy means for changing the endless belts.

When a plurality of units 10 are assembled in a tandem-like fashion as shown in FIGURE 1 into an assembly 14, the brushes may first be fed into the assembly at one end, for example, the right end as viewed in FIGURE 1, where they will be gripped on the opposing faces by the opposed belts 42 and advanced through the first unit to be worked upon by the finishing accessories 12d. The relatively soft sponge-like outer ply of the belts minimizes any possible slippage or canting of the work piece relative to its movement and the relatively stiff backing ply in combination with the back-up rollers affords a sufficient firmness to the grip of the outer ply to hold the article, such as a brush, in its path of travel through the bottomless channel against the influence of gravity. As the brush approaches the area of transition between the first unit 10 to the next unit 10, one face of the brush will engage the transfer spring clip 138b of the unit which it is leaving and then the transfer spring clip 138a of the unit which it is entering while the other face is constantly being fed and held by the leading portion of the opposite belt 42 of the unit 10 which the brush is leaving. Then, for a short distance, the brush is advanced on one face by a belt 42 of the unit from which it is leaving and a belt 42 on the other face of the trailing portion of the unit 10 which it is entering. The belts of the leaving and entering units will be driven at the same speed, particularly if only one motor 48 is used to drive all of the shafts 46 of the assembly so that the transition will be smoothly accomplished. Then the work piece is engaged on its other face by a spring clip 138b of the leading portion of the housing 40 of the unit it is leaving followed by the spring transfer spring clip 138a of the trailing portion of the housing of the unit it is entering until it is then gripped on both faces by opposed belts 42 of the next unit 10 and advanced therethrough. In its next unit the brush may be operated on by a different finishing accessory, such as the accessory 12c, and then subsequently advanced to further units in the same manner as described. If each unit has its own motor, no connection between the units is required. They need merely be butted up to each other. If one motor is provided on one unit and used to drive the several shafts, then the tandem-like assembly of the units must be accompanied by the connection of the universal joints 65 on the shaft ends. Otherwise, no connection is necessary to accomplish this continuous conveying.

Figure 5:
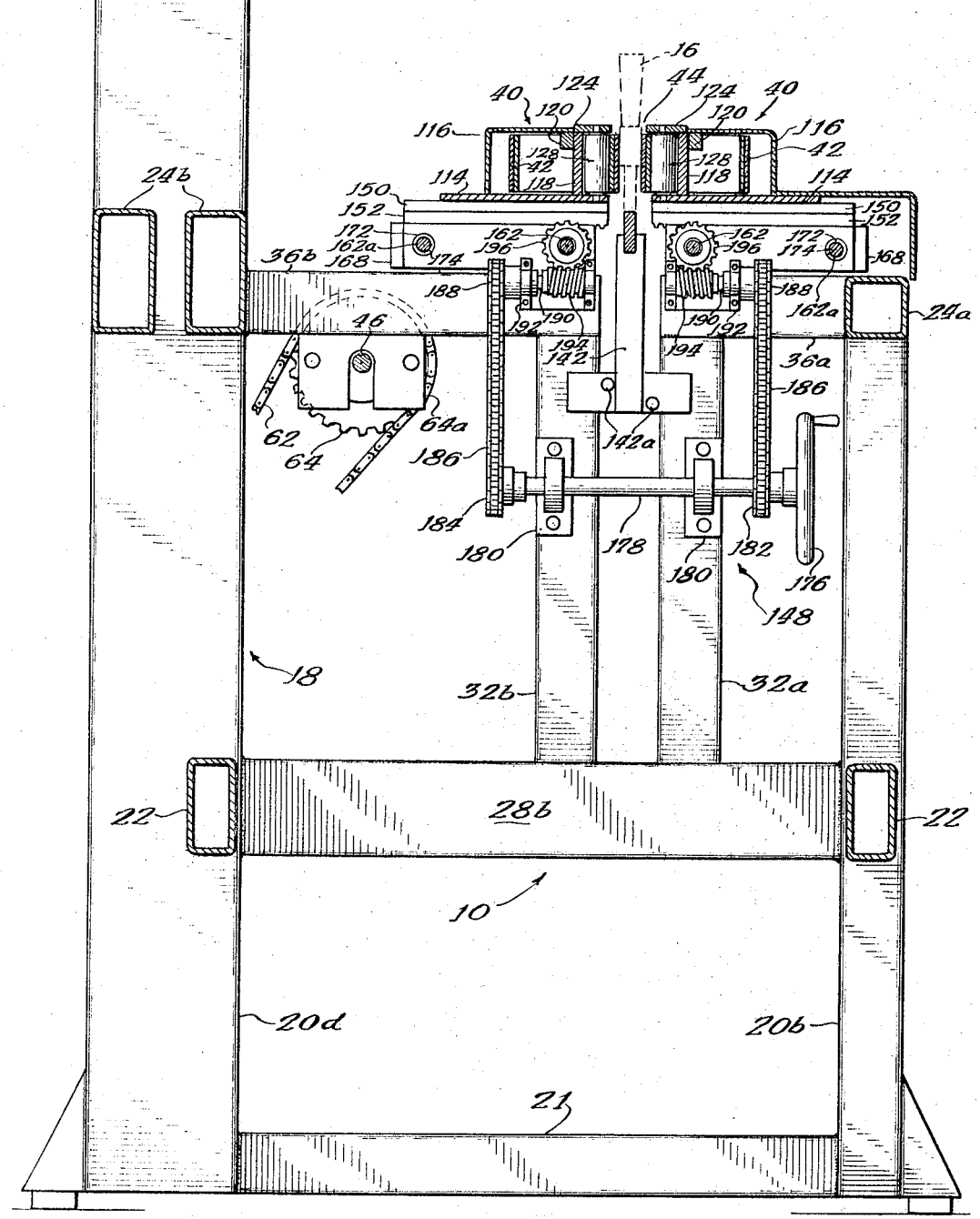
FIGURE 5 is a fragmentary sectional view taken along the line 5—5 of FIGURE 3.

A supporting rail structure 142, such as shown in FIGURES 4, 5 and 9, may be provided to assist in supporting articles carried through the conveyor. While the friction of the belts may be sufficient to hold most objects in the conveyor, it may be desirable, especially in the case of extremely heavy objects, to provide such an auxiliary support. This rail means is removably attached to the framework such as by fasteners 142a so that its installation or removal from the frame is a relatively simple matter.

Because the articles 16 which may be fed through the article advancing channel 44 may differ in size, it is desirable to provide a means 148 for adjusting the gap or width of the channel 44. As best seen in FIGURES 5, 6, 9, and 10, to this end, the underside of the bottom plate 114 of each housing 40 is provided with a bearing plate 150 which extends across the width of each end of each housing in the area of the supporting legs 34a, 34b, 36a and 36b. This bearing plate may be held to the underside of the housing by suitable fastening means such as the screws 151. The bearing plate supports a rack 152 also extending across the width of the housing. The end of the bearing plate closest to the upright supporting legs is provided with a rail slide 154 which is adjacent the rack 152 and secured by such fastening means as screws 156. A generally L-shaped hold-down bar 158 is affixed to the outside of rail slide 154 by means of screws 158a and projects below the bearing plate 150.

The leg of the L-shaped bar 158 and the rail slide 154 define a box-like cavity in which a bar 159 is received. Bar 159 rotatably supports the free end of driven adjustment shaft 162 or generally parallel idler adjustment shaft 162a which extend generally longitudinally of housing 40 and frame 18. Preferably bar 152 is formed of bronze or similar material. This bar supports the weight of the conveyors, relieving other components of the load. Immediately behind the bar 159 and in alignment with the rack 152, a gear 164 is mounted on adjustment shaft 162 in engagement with the rack 152. The gear is in substantial vertical alignment with the respective supporting legs 34a, 34b or 36a, 36b.

Each supporting leg is provided with a generally L-shaped mounting plate 166 secured thereto by means, such as welding, which in turn supports a mounting bar 168 by means of suitable fasteners 170 extending through the mounting plate 166 and mounting bar 168. Mounting bar 168 is positioned generally parallel to the rack 152 and is substantially perpendicular to the plane of the bearing surface 150. A spherical segmental bearing 172 is fixed on the driven shaft 162 and received in an opening 174 in the mounting bar 168.

The upper surface 175 of mounting bar 159 provides a bearing surface for the bearing plate 154 so that as shaft 162 is turned and the gear 164 engages rack 152, the housing 40 moves laterally with respect to the channel 144, being slidingly supported by the facial engagement of the bearing plate 154 and the bearing surface 175 of mounting bar 168. With both such housings 40 being so associated with the frame, the width of the channel may be changed to accommodate different sizes of articles which may be fed through the unit to be worked upon by whatever accessory may be secured to the unit.

The driven adjustment shaft 162 is operated by a means including a handle or crank 176 mounted on one end of a shaft 178 extending in a forwardly-rearwardly direction generally parallel to and midway between cross brace 28b and legs 36a and 36b in mounting means 180 which is secured to support members 32a and 32b. The shaft 178 is provided with a sprocket 182 at the forward end (forwardly of support member 32a) and a sprocket 184 at the rear end (rearwardly of the support member 32b). Each spocket drives an endless chain 186 which, in turn, engages a sprocket 188 associated with each housing 40. Sprocket 188 is mounted on a shaft 190 journalled for rotation in a bracket 192 secured to each supporting leg 36a and 36b adjacent the channel 44. Each shaft 190 is provided with a worm gear 194 which is in meshing driving engagement with a gear 196 mounted on adjustment shaft 162 to the inside of support members 32a and 32b.

As handle 176 is turned, shaft 178 is rotated and, by means of sprockets 182 and 184 on shaft 178, chains 186 are driven. Each chain 186 engages a sprocket 188 mounted on the worm shaft 190 which turns the worm gear 194. The worm gear 194, being engageable with 196, turns that gear which causes rotation of shaft 162. This in turn causes the gear 164 on either end of the shaft to rotate and, by virtue of its engagement with the racks 152 on the underside of each housing, the housings are moved toward or away from each other depending upon the original direction of turning of the handle 176. In this manner, the width of the channel 144 may be adjusted to accommodate articles of different sizes which may be fed through the conveyor apparatus. This adjustment is infinite in its variation, affording great versatility to the minute size changes in articles that may be fed by the conveyor unit of this invention. Moreover, this adjustment in combination with the relatively soft outer ply of the conveyor belt permits the width of the channel to be changed to accommodate articles of perhaps the same size as previously conveyed articles but of more fragile construction which might be deformed by a relatively tight captivation between the belts.

With the conveyor of this invention, a continuous finishing operation may be performed upon an article without the need for external assistance in the flow of the article through the finishing system. The basic conveyor units are such that different finishing accessories may be mounted thereon without detracting from the ability to position the several units in tandem to form a finishing assembly. The belt housings are mounted to the conveyor frame in such a manner as to permit changes in the dimension of the channel between the belts, yet only one driven shaft is required to drive both belts of each belt housing. Moreover, when several units are assembled in tandem, only one motor is necessary to drive the continuously linked drive shaft of each individual unit.

The foregoing detailed description has been given for clearness of understanding only, and no unnecessary limitations should be understood therefrom, as some modifications may be obvious to those skilled in the art.

I claim:

1. A nestable apparatus for advancing articles in processional order which may be associated with other substantially identical apparatuses to perform an endless article advancing assembly, comprising: a frame; a driven shaft mounted on said frame; first and second belts on said frame, driven by said shaft and spaced from each other and defining an article advancing channel therebetween, said belts being mounted on the frame in a staggered relation to each other so that the lead portion of the first belt extends ahead of the lead portion of the second belt and the trailing portion of the second belt extends behind the trailing portion of the first belt, whereby a plurality of said apparatuses may be mated together with the lead portion of the first belt of one apparatus opposite the trailing portion of the second belt of the other apparatus, so that articles may be continuously advanced through the apparatuses by simultaneous engagement of said one apparatus first belt and said other apparatus second belt.

2. The apparatus of claim 1 wherein said belts are mounted on said frame for movement toward and away from each other to change the size of the article advancing channel to accept and advance articles of different dimensions therethrough.

3. The apparatus of claim 1 wherein said driven shaft has connectable mating ends to facilitate connection with the ends of shafts of other substantially identical article advancing units to permit common driving of the shafts from a single source of power on one unit.

4. The apparatus of claim 1 wherein said belts are generally coextensive in length so that when said two such apparatuses are mated with the lead portion of the first belt of one apparatus opposite the trailing portion of the second belt of the other apparatus, a generally uninterrupted closed channel is provided therebetween.

5. The apparatus of claim 1 wherein each of said belts are wrapped around pulleys, at least one of each belt pulleys being driven by said driven shaft, and a plurality of rollers are mounted on the inside of each belt in the area of the channel defined therebetween to provide a relatively inflexible backing surface therefor.

6. The apparatus of claim 5 wherein a member is mounted on the frame adjacent the pulleys where the belts return about the pulleys away from the article advancing channel providing an intermediate continuation of the channel defined by said belts, said member being opposite a belt of another apparatus and adjacent another similar member of the other apparatus on the same side of the article advancing channel when two such apparatus are nested together to provide a continuous article advancing assembly.

7. The apparatus of claim 5 wherein each belt is mounted in a housing which includes a base having a rack on the underside thereof and wherein the frame is provided with an adjustment shaft rotatably journalled therein and a gear on the adjustment shaft in engagement with each rack so that rotation of the shaft moves each housing in a direction generally normal to the article advancing channel to change the size thereof for accommodating articles of different dimensions.

8. The apparatus of claim 5 wherein the said one driven pulley of each housing is connected to a gear positioned exteriorly of the housing and wherein the frame is provided with a worm shaft having a worm in engagement with said gear, the worm shaft being driven by said drive shaft to thereby drive said pulley and move the belt through the article advancing path.

9. The apparatus of claim 8 wherein the drive shaft drives a chain which is connected to two drive sprockets journalled in the frame, each drive sprocket having a chain which is connected to two drive sprockets journalled in the frame, each drive sprocket having a chain connected to a worm shaft sprocket on the worm shaft to drive each belt pulley.

10. A nestable apparatus for advancing articles in processional order which may be associated with other substantially identical apparatuses to perform an endless article advancing assembly, comprising: a frame; a driven shaft mounted on said frame; first and second belts on said frame, driven by said shaft and spaced from each other and defining an article advancing channel therebetween, said belts being mounted on the frame in the same plane in a staggered relation to each other so that the lead portion of the first belt extends ahead of the lead portion of the second belt and the trailing portion of the second belt extends behind the trailing portion of the first belt, said belts being generally coextensive in length, whereby a plurality of said apparatuses may be mated together with the lead portion of the first belt of one apparatus opposite the trailing portion of the second belt of the other apparatus, so that articles may be continuously advanced through the apparatuses by simultaneous engagement of said one apparatus first belt and said other apparatus second belt.

11. The apparatus of claim 10 wherein each belt is mounted in a housing and each housing has at least one pulley at its opposite ends about which the belts are wrapped, each housing further including a channel continuation member mounted between the end of the housing and extending towards the pulley in a plane generally tangential to the periphery of the pulley and generally parallel to the portion of the belt defining one side of the article advancing channel whereby when two or more of such apparatuses are mated together with the lead portion of the first belt of one apparatus opposite the trailing portion of the second belt of the other apparatus and the lead portion of the first belt of one apparatus adjacent the trailing portion of the first belt of the other apparatus, said channel continuation members on the lead portion of the first belt of one apparatus and the trailing portion of the first belt of the other apparatus will be generally opposite the second belt on the trailing portion of the other apparatus to provide smooth continuity of advancement of articles between two such mated apparatuses.

References Cited by the Examiner
UNITED STATES PATENTS

| 1,911,961 | 5/1933 | Melnick | 198—162 |
| 2,421,515 | 6/1947 | McNamara et al. | 198—165 X |
| 2,806,582 | 9/1957 | Sindzinski | 198—165 |
| 3,179,237 | 4/1965 | Ninneman | 198—165 |

EVON C. BLUNK, *Primary Examiner.*

A. C. HODGSON, *Assistant Examiner.*